US008363426B2

(12) United States Patent
Katargin et al.

(10) Patent No.: US 8,363,426 B2
(45) Date of Patent: Jan. 29, 2013

(54) REACTIVE CURRENT TRANSFORMER

(76) Inventors: Rudolf Klavdievich Katargin, Moscow (RU); Alexander Yevgenievich Soldatov, Surrey (CA)

( * ) Notice: Subject to any disclaimer, the term of this patent is extended or adjusted under 35 U.S.C. 154(b) by 0 days.

(21) Appl. No.: 13/240,807

(22) Filed: Sep. 22, 2011

(65) Prior Publication Data

US 2012/0086413 A1 Apr. 12, 2012

Related U.S. Application Data

(60) Provisional application No. 61/404,833, filed on Oct. 12, 2010, provisional application No. 61/511,606, filed on Jul. 26, 2011.

(51) Int. Cl.
*H02M 3/335* (2006.01)

(52) U.S. Cl. .......................................... 363/17; 378/112

(58) Field of Classification Search .......... 323/208–211, 323/205; 363/36–46, 16–17, 56.05, 59, 132, 363/133; 324/67, 207, 226, 236, 326, 327, 324/239; 378/65, 69, 111, 119
See application file for complete search history.

(56) References Cited

U.S. PATENT DOCUMENTS

| | | | | |
|---|---|---|---|---|
| 3,936,727 | A | 2/1976 | Kelley | |
| 4,541,041 | A * | 9/1985 | Park et al. | 363/41 |
| 4,680,531 | A | 7/1987 | Rey | |
| 5,003,452 | A * | 3/1991 | Sireul et al. | 363/61 |
| 5,023,768 | A * | 6/1991 | Collier | 363/68 |
| 5,430,341 | A * | 7/1995 | Summer | 310/323.21 |
| 6,081,329 | A * | 6/2000 | Cohn et al. | 356/316 |
| 6,822,250 | B2 * | 11/2004 | Korenev | 250/492.3 |
| 6,919,712 | B1 | 7/2005 | Kitamure | |
| 7,180,248 | B2 * | 2/2007 | Kuennen et al. | 315/224 |

* cited by examiner

*Primary Examiner* — Rajnikant Patel
(74) *Attorney, Agent, or Firm* — Nadya Reingand

(57) ABSTRACT

An apparatus and method for utilizing reactive power in electric power generating facilities. The primary energy source is a reactive power provided by a source of high-frequency, high-voltage electromagnetic oscillations. As a device, the Reactive Current Transformer consists of a high-voltage, high-frequency electromagnetic generator, preferably Tesla Resonant Transformer and of inductive receiving coils, electromagnetically coupled in the absence of a ferromagnetic core, adjusted in resonance with this electromagnetic generator and mounted in any required quantity, close to it. Energy, emitted by the electromagnetic generator, is being transferred to inductive coils. Reactive current induced in the inductive coils can be collected from them and converted to a standard AC voltage for further use by any convenient way, preferably with a help of additional inductive transforming windings, mounted together and electromagnetically coupled with these inductive coils.

15 Claims, 4 Drawing Sheets

REACTIVE CURRENT TRANSFORMER

CROSS-REFERENCE TO RELATED APPLICATION

This patent application claims priority to U.S. Provisional Application No. 61/404,833 filed Oct. 12, 2010 and U.S. Provisional Application No. 61/511,606 filed Jul. 26, 2011.

FIELD OF THE INVENTION

The invention relates to an ecologically clean electric power generation, specifically to the methods and technology of utilizing reactive power component of electric energy and converting it into an active power with an output alternating current (AC) of a given frequency and voltage magnitudes.

BACKGROUND OF THE INVENTION

The most recent economy trend in terms of power generation is directed towards renewable energy sources, saving the environment and capable of insuring a certain extent of energy independence for its consumers. One of the most significant, perspective and still unrealized sources is the reactive power. Technology of reactive power conversion into a useful energy that may be conveniently used by industrial and commercial facilities hasn't existed until now. This new technology will let to utilize the reactive power as a primary energy source and to convert it into a standard AC voltage for its farther use by different consumers.

Reactive power is considered to be an extremely negative phenomenon. Huge resources are being wasted to withstand the reactive power in power lines today. Significant efforts are being made as well to control and compensate the reactive power in power transmission and distribution systems consist of generating facilities, nets and consumers.

The level of the reactive power problem could be illustrated on an example of yesteryears three-phase devices. Up to three power stations were being used to supply merely ten enterprises those days. A sudden surge of power, increased standard 380 V voltage to 450-600 Volts, forcing electric machines to exceed their ability, which caused overloading of generating facilities on power stations and as a result, were disconnected from an overstrain or just were destroyed. It was an action of mighty reactive power.

It appears the reactive power has the same nature, as an active electric power, but arising from a resonance of inductance together with electric capacitance in the power network system, and is always directed back from consumers to their power station generators i.e. contrary to a working current from generators. It causes networks overheating and huge additional quantities of fuel wasting for its compensation.

Under the assumption of a great majority of engineers, reactive power is scooped from a magnetic field of the Earth and electric potential of its atmosphere.

Nikola Tesla was possibly the first who utilized reactive power in its useful purposes. It rotated an electromotor of his famous electro mobile, but principal schemes of this unit do not exist and we can only make assumptions There is another example of a reactive power usage in practice. Dr. Vachaev (Russia) conducted his researches from 1960-70. He tested a water deep cleaning and treatment device with extraction of various substances from water suspension. His device had an extremely simple design. 220 Volt was applied to the scheme as indicated in FIG. 1. The current travelled through additional resistance R 2 to transformer TR 5 connected with a capacity C 4 (180-200 uF) and farther to a tubular sparking gap TD 3 immersed in a water. A tubular sparking gap was covered by a coil being fed with a direct current (not shown on the scheme). A small fireball discharge appeared at arch ignition in the gap, and powerful electromagnetic oscillations with about 30 MHz frequency occurred in the device. A strong reactive current arose in the transformer-condenser contour. The resistance R 2 served for limitation of this reactive current. As the key SW 1 was switched on load LR 6, the given contour became a source of a current itself and simultaneously made a self-supporting system for a significant period of time. But this design was limited in its constant generating ability by applied transformer with its iron core.

A Tesla air-core resonant type transformer invented by Nicola Tesla around 1891, shown schematically in FIG. 2, is effective, reliable and cost effective generator of high-voltage and high-frequency electromagnetic oscillations, which can be successfully used for exciting the system with a reactive power.

A Tesla coil type transformer (Tesla transformer) consists of a driving generator, a primary driving oscillating resonant circuit (primary coil) 7 and a secondary exciting oscillating resonant circuit (secondary coil) 8. The driving generator is intended for producing electric current oscillations to make the emitting secondary coil 8 to emit the electromagnetic radiation.

Typical Tesla transformer spark gap type driving generator comprises a high-voltage supplying transformer 9. The output of supplying transformer is rectified by a full wave bridge 10. Tesla transformer primary coil 7, a spark gap 11 and a high-voltage capacitor 12 are connected in series. The primary coil 7 is loosely electromagnetically coupled with the secondary coil 8, in the absence of a ferromagnetic core through mutual inductance. A discharge needle 13 is connected to the end of the secondary coil winding wire and is mounted on its top for a discharge corona creation purpose. Another end of the secondary coil winding wire is grounded.

Tesla transformer can have a spark gap, a transistor or a vacuum tube driving generator type.

SUMMARY OF THE INVENTION

The objective of the present invention is utilizing a reactive power as the primary energy with its conversion into an active power with an output alternating current (AC) of a given frequency and voltage magnitudes for further use in common electric distribution grids and to provide a design for a Reactive Current Transformer utilizing this reactive power.

The basic principle underlying the transformer is the following. A source of electromagnetic radiation (SEMR) emitting an exciting oscillations of power. In the preferred embodiment the SEMR is the Tesla coil type transformer. A receiving inductive coil is positioned close to the SEMR at a distance range of 5 to 400 inches it receives a coil induced power in vicinity of said SEMR. This power induces an induced alternating current (AC) in this inductive coil. The transformer has also a collector that is able to collect the coil induced power from the receiving inductive coil and convert its own induced AC into the output with the given frequency and voltage magnitude. In the preferred embodiment the collector has inductive windings mounted together with the receiving inductive coil and electromagnetically coupled with it. The receiving inductive coil may be grounded.

It is important to tune the receiving inductive coils to be in resonance with an emitting antenna of the SEMR and loosely coupled with it. In one embodiment an additional feedback loop with an automatic frequency control circuit is provided to keep them in resonance.

In the preferred embodiment the transformer further includes additional inductive coils that surround the SEMR. The number of inductive coils must be sufficient to achieve the required magnitude of the system output, since all coils contribute to the system output.

Another object of the present invention is a method for producing an electrical current via inductively transforming a reactive power into an active power with an output alternating current (AC) of a given frequency and voltage magnitudes. The method include emitting of electromagnetic (EM) radiation, positioning inductive coils close to the source of EM radiation, tuning a resonance of said inductive coils and the source of EM radiation to resonate at the same frequency, receiving a coil induced power by said inductive coils in vicinity of said source of EM radiation and producing an induced alternating current, which is collected from said inductive coils and converted to the AC output with the given frequency and voltage magnitudes.

BRIEF DESCRIPTION OF THE DRAWINGS

The subject matter that is regarded as the invention may be best understood by reference to the following description taken in conjunction with the accompanying drawing figures in which.

DETAILED DESCRIPTION OF PREFERRED EMBODIMENTS

We have discovered a phenomenon. The phenomenon and design built on its basis consists in that: energy emitted by a source of electromagnetic (EM) radiation excites a power induction in inductive coils placed close enough to this source of EM radiation, loosely electromagnetically coupled and tuned to resonate at the same frequency with it. The capacity of energy, being induced in each inductive coil, depends only on a distance between this coil and the source of EM radiation, under the constant AC voltage and frequency output magnitudes. The quantity of inductive coils, being mounted around the source of EM radiation has no any influence on the effect of power induction in them and can be any possible.

Energy transfer process is in a square-law dependence on this source of EM radiation voltage output level and in a direct dependence on its output frequency.

As far as inductive coils are inductances and the Earth performs as a natural electric capacitance, together they perform as oscillatory contour regarding to a generator of electric current oscillations. The driving generator produces current oscillations to make the emitting oscillatory circuit to emit the EM radiation, which excites a power induction in the inductive coils electromagnetically loosely coupled with this source of EM radiation. Reactive power arising in this resonant system, consists of a driving generator and an oscillatory contour, can not return to the generator in a full quantity because of lack of a strong electromagnetic coupling between this oscillatory contour and the generator (coupling coefficient $k \leqq 0.48$), instead, reactive power becomes available for its utilizing. Energy being induced in the receiving inductive coils can be collected from them and converted into an output alternating current of a given frequency and voltage magnitudes for its further use.

Figure 6:
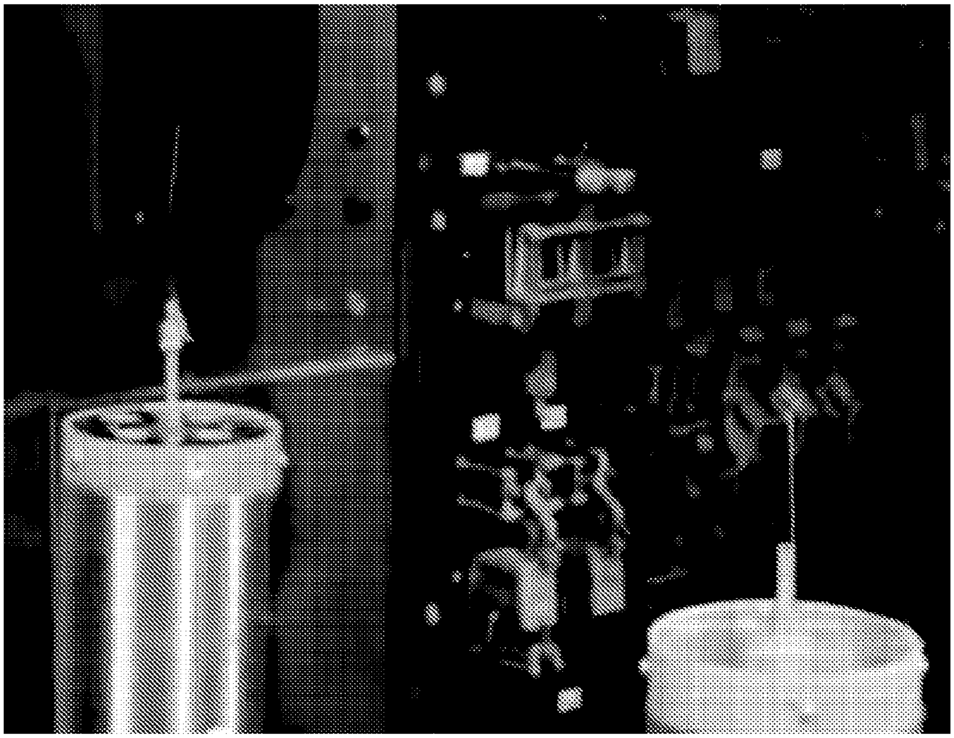
FIG. 6 shows experimental results demonstrating discharge corona on the top of the receiving coil (on the left). The receiving coil is placed in vicinity of the Tesla coil type transformer, which also has discharge corona (on the right).

As shown in FIG. 6 experimental results demonstrating discharge corona on the top of the receiving coil (on the left). The receiving coil is placed in vicinity of the Tesla coil type transformer, which also has discharge corona (on the right). That is a visible indicator of energy, being transferred to the receiving coil.

Figure 1:
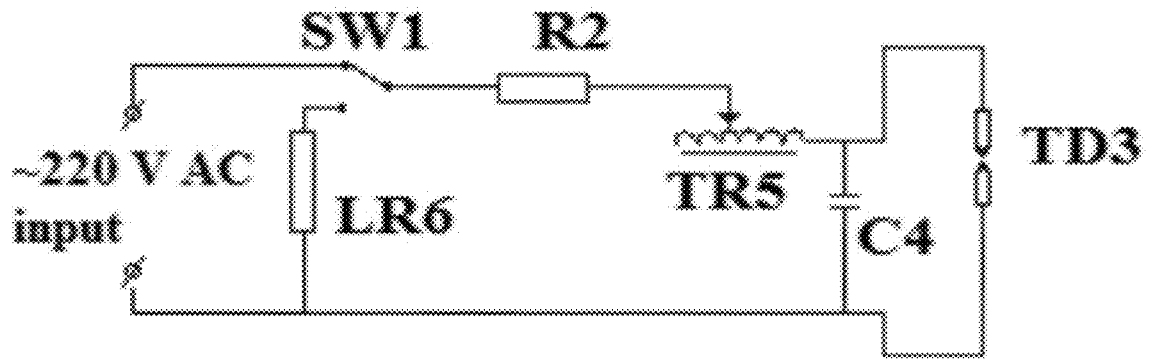
FIG. 1 (Prior art)
FIG. 1 shows a principle circuit chart of Dr. Vachev's device for water deep cleaning and treatment of a prior art.
Figure 2:
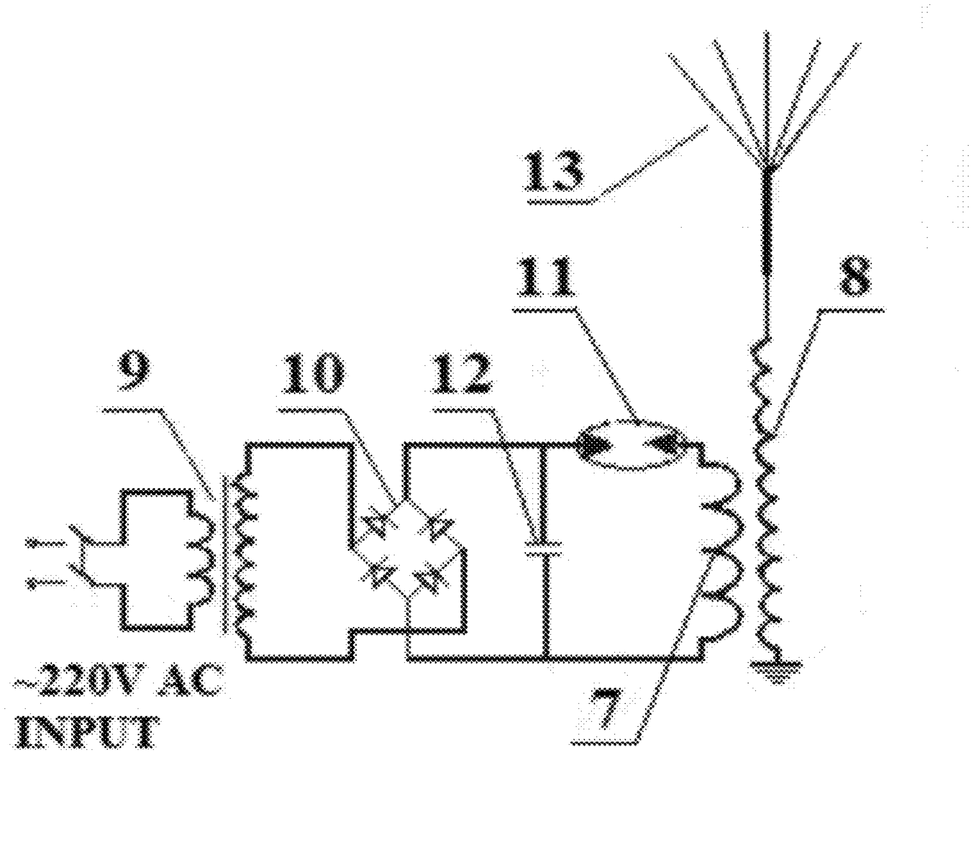
FIG. 2 (Prior art)
FIG. 2 shows a typical Tesla coil type transformer schematic with a spark gap driving generator of a prior art.

An apparatus utilizing reactive power component of electric energy, based on the above mentioned phenomenon, is named a Reactive Current Transformer (RCT). It consists of a source of high-frequency, high-voltage electromagnetic radiation (SEMR), preferably a Tesla coil type Transformer (Tesla transformer) of FIG. 2, intended for exciting the system with oscillating power, receiving inductive coils (receiving coils), intended for receiving the induced energy and producing an induced alternating current (AC), a collector intended for collecting of coil induced energy from these receiving coils and converting the induced AC into the output with the given frequency and voltage magnitudes.

For this purpose, the receiving coils should be loosely electromagnetically coupled in the absence of a ferromagnetic core with their SEMR, tuned to resonate at the same frequency with it, mounted close to the SEMR in any required quantity (depending on a desirable capacity of the RCT), taking necessary precautions against a possibility of high-voltage breakdown from the SEMR loaded parts.

High-voltage and high-frequency AC being induced in these inductive receiving coils, must be collected from them and then converted to a standard AC voltage with industrial frequency, as it is impossible for consumers to use a high-voltage, high-frequency current (up to Million volts and Hertz pulses), being formed on the receiving coils.

Additional inductive transforming windings with a proper number of wire turns (transforming coils) mounted inside each receiving coil and electromagnetically coupled with them, serve for this purpose.

The coil induced AC being collected from the receiving coils and adjusted to a standard AC voltage magnitude with the help of transforming coils, can be then adjusted to a standard industrial AC frequency magnitude by any method, as is known in the art.

Figure 3:
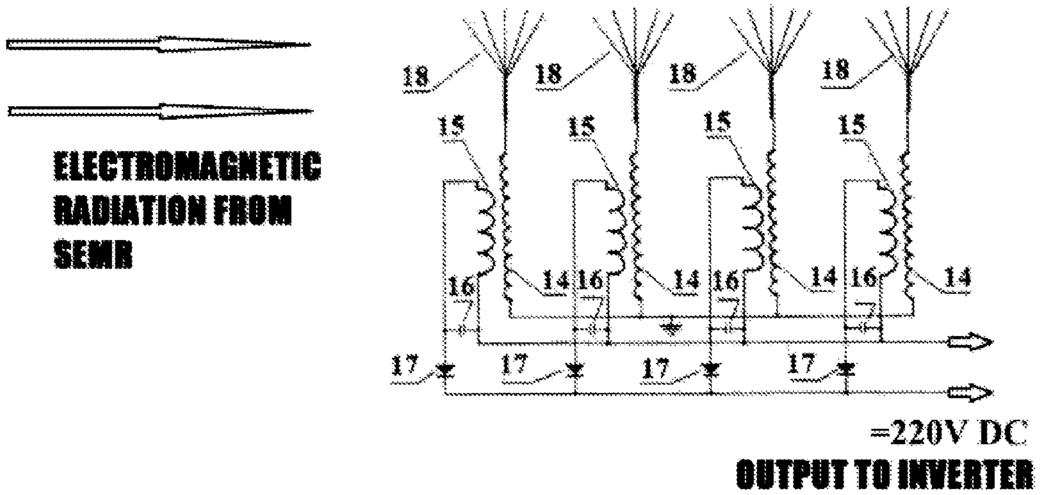
FIG. 3 shows a Reactive Current Transformer principal scheme of the present invention with four inductive receiving coils, mounted together with transforming coils.
Figure 4:
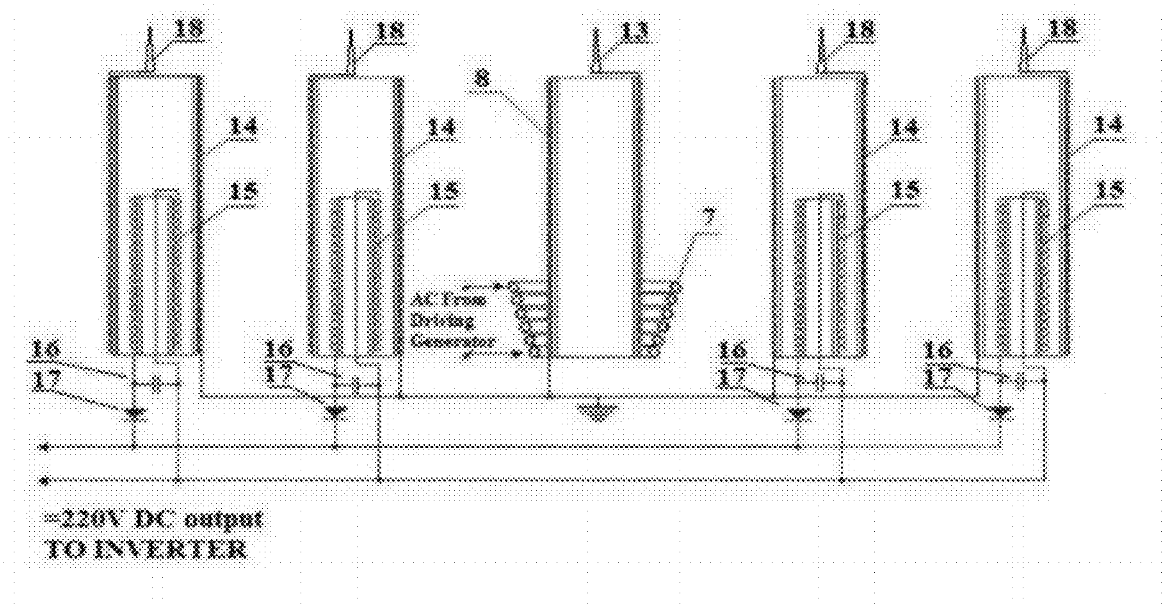
FIG. 4 shows a Reactive Current transformer mounting scheme of the present invention.

One embodiment of the RCT of the present invention, indicated schematically in FIG. 3 and FIG. 4, comprises an Exciting, Receiving and Transforming parts.

The RCT Exciting part is a source of electromagnetic radiation (SEMR) of any design and type but the preferred source is a Tesla transformer.

The SEMR consists of an emitting oscillating resonant circuit (EORC) and a driving generator producing electric current oscillations to make the EORC to emit the electromagnetic (EM) radiation.

The RCT Receiving part consists of receiving inductive coils (receiving coils) 14 which have the same design and parameters as the Tesla transformer exciting secondary coil 8.

Receiving inductive coils are loosely electromagnetically coupled in the absence of a ferromagnetic core with the emitter of EM radiation, inductive coupling coefficient k≦0.48.

Receiving inductive coils are tuned to resonate at the same frequency with the the emitter of EM radiation.

Figure 5:
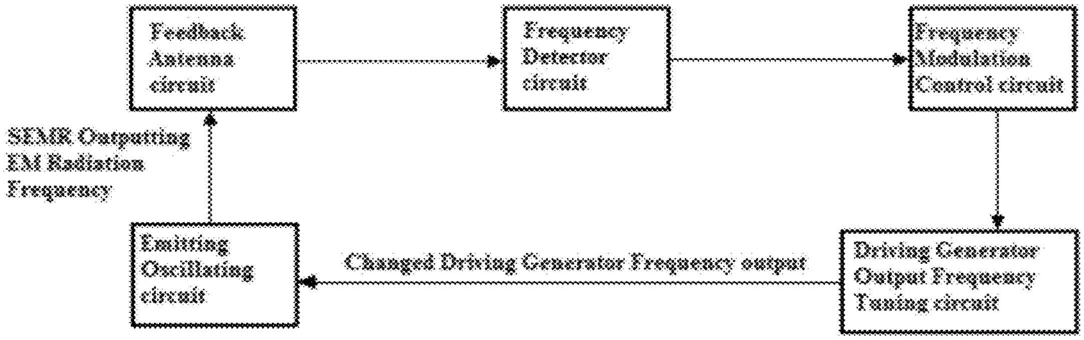
FIG. 5 shows an automatic frequency control diagram for the driving generator outputting AC frequency being tuned to a changing resonance in the exciting oscillating resonant circuit.

The RCT can be additionally supplied with an automatic frequency control (AFC) to automatically keep the Tesla transformer driving generator outputting AC frequency being tuned to a changing resonance in the secondary coil as is indicated schematically in FIG. 5. The AFC circuit is not applied in the preferred embodiment.

For illustration of the working principles of the present invention it will be regarded the RCT in the embodiment with four receiving coils, as is indicated schematically in FIG. 3 and FIG. 4, though it could be as many receiving coils, as required on practice and the quantity of receiving coils being used in a unit is determined by a desired capacity of the system only.

The receiving coils in the preferred embodiment are executed by enamel insulated copper wire (AWG 20, 1000 turns) reeled up on an isolating pipe (7 inches in diameter and 40 inches tall). A discharge needle 18 is connected to one end of the receiving coils winding wire and is mounted on its top for a discharge corona creation purpose. Another end of the receiving coils winding wire is grounded.

The emitter of electromagnetic radiation output capacity in our example is 1.5 kW, its output voltage is 200 kV, emitted current frequency is 200 kHz, a distance between emitting antenna and the receiving coils 14 is 40 inches. Every receiving coil receives about 0.3 kW of induced energy under these conditions. Together they produce about 1.2 kW of induced energy.

If the receiving coils are being placed farther, saying on a distance of 10 feet from the emitting secondary coil of a working Tesla transformer, the coronas on their discharge needles 18 almost go out and capacity of induced energy in each receiving coil falls down to several Watts.

The RCT Transforming part consists of a collector of any kind, intended for collecting the coil induced energy from the receiving coils and converting this energy into an AC with given voltage magnitude. It is convenient on practice to use additional inductive windings, named transforming coils 15 for this purpose.

Transforming coils should be electromagnetically coupled with their receiving coils and mounted inside them, as is indicated schematically in FIG. 4. A proper number of wire turns in the transforming coil winding provide a transformation of high-voltage, high-frequency AC, being collected from the receiving coils, to a standard voltage magnitude.

This high-frequency AC obtained from the transforming coils can be then adjusted to a standard industrial frequency 50/60 Hz AC voltage, for its further utilizing in a common electric distribution grid. It is convenient on practice to rectify collected high-frequency alternating current (AC) to a direct current (DC) with a help of diodes 17, switched in series and balanced by capacitors 16. Then this DC should be inverted back to an AC with a given frequency magnitude, with a help of a standard inverter.

The suggested method of producing an electrical current via inductively transforming a reactive power into an active power with an output alternating current of a given frequency and voltage magnitudes and its embodiment comprising a combination of inductive receiving coils, mounted in any required quantity, together with transforming coils, close to a source of EM radiation, loosely electromagnetically coupled and adjusted in resonance with their SEMR is the subject of the present invention and the main point, which differs this new Reactive Current Transformer from the known Tesla transformer or any known method of electric power generation.

FIG. 6 shows the experimental results demonstrating the generation of induced electrical current in the inductive coil (left) placed in vicinity of an emitting coil (right) of Tesla transformer.

While embodiment of the present invention has been described above, it should be understood that it has been presented by way of example only, and not limitation. Thus, the breadth and scope of the present invention should not be limited by the above-described exemplary embodiment, but should be defined only in accordance with the following claims and their equivalents.

The previous description of the preferred embodiment is provided to enable any person skilled in the art to make or use the present invention. While the invention has been particularly shown and described with reference to preferred embodiment thereof, it will be understood by those skilled in the art that various changes in form and details may be made therein without departing from the spirit and scope of the invention.

What is claimed is:

1. A Reactive Current Transformer (RCT) utilizing a reactive power component of electric energy and converting it into an active power with an output alternating current (AC) of a given frequency and voltage magnitudes, comprising:

a source of electromagnetic radiation (SEMR) for emitting an exciting oscillations of power;

at least a first receiving inductive coil (Receiving Inductive Coil), positioned close to the emitting oscillating resonant circuit (EORC) of said SEMR at a range of 5 to 400 inches, taking necessary precautions against a possibility of high-voltage breakdown from the SEMR loaded parts; the Receiving Inductive Coils intended to receive a coil induced power excited by oscillating electromagnetic field and to produce an induced alternating current (AC); and a collector intended for collecting the coil induced power from said Receiving Inductive Coil and converting a collector induced AC into the output AC with the given frequency and voltage magnitude.

2. The RCT of claim 1, wherein at least the first Receiving Inductive Coil is loosely electromagnetically coupled in the absence of a ferromagnetic core with the EORC of the SEMR, with a coupling coefficient k<0.48.

3. The RCT of claim 2, wherein at least the first Receiving Inductive Coil is tuned to resonate at the same frequency with the SEMR.

4. The RCT of claim 3, wherein the Receiving Inductive Coil is grounded.

5. The RCT of claim 4, wherein the collector comprises an additional inductive winding, mounted together with each said Receiving Inductive Coil and electromagnetically coupled with it, intended for collecting the coil induced power from said Receiving Inductive Coil and transforming the induced AC voltage into the output AC with the given voltage magnitude.

6. The RCT of claim 5, further comprising additional Receiving Inductive Coils, as many as required to get a necessary output capacity of the system, loosely electromagnetically coupled with the EORC of said SEMR in the absence of a ferromagnetic core and tuned to resonate at the same frequency with the EORC of said SEMR, performing the function as the first Receiving Inductive Coil; each Receiving Inductive Coil supplied with the collector intended for collecting the coil induced power from said Receiving Inductive Coil and transforming the induced AC voltage to a necessary AC voltage outputting magnitude, all the Receiving Inductive Coils contributing to the RCT output.

7. The RCT of claim 6, further comprising an automatic frequency control to automatically keep the EORC outputting frequency being tuned in a resonance with the Receiving Inductive Coil.

8. The RCT of claim 7, wherein the SEMR is being fed by initial electric power from a battery or an outer electric net.

9. The RCT of claim 8, further comprising a power feeding circuit from the system output back to the SEMR input to produce a feedback source of electric power, intended for self-feeding the RCT with electric power.

10. A method for producing an electrical current, said method comprising:

inductively transforming a reactive power into an active power with an output alternating current (AC) of a given frequency and voltage magnitudes, wherein the transforming is performed by loosely electromagnetically coupling Receiving Inductive Coils with a source of electromagnetic radiation (SEMR) in the absence of a ferromagnetic core with a coupling coefficient $k<0.48$;

positioning said Receiving Inductive Coils close to said SEMR at a range of 5 to 400 inches, taking necessary precautions against a possibility of high-voltage breakdown from the SEMR loaded parts;

tuning a resonance of said Receiving Inductive Coils and the SEMR to resonate at the same frequency;

receiving a coil induced power, excited by oscillating electromagnetic field generated by said SEMR and producing an induced alternating current, which is collected from said Receiving Inductive Coils with a help of additional windings mounted together with each said Receiving Inductive Coil;

converting the coil induced power to the AC output with the given frequency and voltage magnitudes.

11. The method of claim 10, wherein the Receiving Inductive Coils are grounded in order to get additional electric capacitance, essential for the Receiving Inductive Coils to perform as an oscillatory contour regarding to the SEMR.

12. The method of claim 10, wherein collecting is performed by an additional inductive winding, mounted together with each said receiving inductive coil and electromagnetically coupled with it, intended for collecting the coil induced power from said receiving inductive coil and transforming the induced AC voltage to a necessary AC voltage outputting magnitude.

13. The method of claim 10, wherein SEMR is fed by initial electric power from a battery or an outer electric net.

14. The method of claim 10, wherein the SEMR is additionally fed by the system output back to said SEMR input to produce a feedback source of electric power, intended for self-feeding the RCT.

15. The method of claim 10, wherein SEMR is a Tesla Coil type transformer.

* * * * *